(12) United States Patent
Cohen

(10) Patent No.: US 8,522,073 B2
(45) Date of Patent: Aug. 27, 2013

(54) DISTRIBUTED STORAGE OF RECOVERABLE DATA

(75) Inventor: Bram Cohen, Mill Valley, CA (US)

(73) Assignee: BitTorrent, Inc., San Francisco, CA (US)

( * ) Notice: Subject to any disclaimer, the term of this patent is extended or adjusted under 35 U.S.C. 154(b) by 10 days.

(21) Appl. No.: 12/699,670

(22) Filed: Feb. 3, 2010

(65) Prior Publication Data

US 2010/0199123 A1  Aug. 5, 2010

Related U.S. Application Data

(60) Provisional application No. 61/149,676, filed on Feb. 3, 2009.

(51) Int. Cl.
*G06F 11/00* (2006.01)
(52) U.S. Cl.
USPC .......................... 714/6.2; 714/4.11; 714/6.32
(58) Field of Classification Search
None
See application file for complete search history.

(56) References Cited

U.S. PATENT DOCUMENTS

| | | | |
|---|---|---|---|
| 7,596,673 B2 * | 9/2009 | Read | 711/170 |
| 7,734,643 B1 * | 6/2010 | Waterhouse et al. | 707/770 |
| 7,778,960 B1 * | 8/2010 | Chatterjee et al. | 707/609 |
| 2004/0128587 A1 * | 7/2004 | Kenchammana-Hosekote et al. | 714/43 |
| 2005/0091556 A1 * | 4/2005 | Frolund et al. | 714/2 |
| 2005/0114729 A1 * | 5/2005 | Nielsen et al. | 714/7 |
| 2005/0120025 A1 * | 6/2005 | Rodriguez et al. | 707/10 |
| 2005/0198238 A1 | 9/2005 | Sim et al. | |
| 2005/0216813 A1 | 9/2005 | Cutts et al. | |
| 2006/0251062 A1 * | 11/2006 | Jain et al. | 370/389 |
| 2007/0079082 A1 | 4/2007 | Gladwin et al. | |
| 2007/0177739 A1 * | 8/2007 | Ganguly et al. | 380/277 |
| 2008/0126723 A1 * | 5/2008 | Ashton et al. | 711/162 |
| 2008/0243773 A1 * | 10/2008 | Patel et al. | 707/2 |
| 2010/0064166 A1 * | 3/2010 | Dubnicki et al. | 714/4 |
| 2010/0251067 A1 * | 9/2010 | Hughes et al. | 714/755 |

OTHER PUBLICATIONS

PCT International Search Report and Written Opinion, PCT Application No. PCT/US2010/023075, Mar. 31, 2010, seven pages.
European Extended Search Report, European Application No. 10739071.8, Jan. 18, 2013, 10 pages.
Russian Office Action, Russian Application No. 2011136622, Nov. 15, 2012, 5 pages.

* cited by examiner

*Primary Examiner* — Michael Maskulinski
*Assistant Examiner* — Neil Miles
(74) *Attorney, Agent, or Firm* — Fenwick & West LLP

(57) ABSTRACT

A system, method, and computer program product replace a failed node storing data relating to a portion of a data file. An indication of a new storage node to replace the failed node is received at each of a plurality of available storage nodes. The available storage nodes each contain a plurality of shares generated from a data file. These shares may have been generated based on pieces of the data file using erasure coding techniques. A replacement share is generated at each of the plurality of available storage nodes. The replacement shares are generated by creating a linear combination of the shares at each node using random coefficients. The generated replacement shares are then sent from the plurality of storage nodes to the indicated new storage node. These replacement shares may later be used to reconstruct the data file.

23 Claims, 5 Drawing Sheets

DISTRIBUTED STORAGE OF RECOVERABLE DATA

CROSS-REFERENCE TO RELATED APPLICATIONS

This application claims the benefit of U.S. Provisional application 61/149,676, filed on Feb. 3, 2009, which is incorporated by reference herein in its entirety.

BACKGROUND

1. Field

The present invention relates generally to the distributed storage of data over various nodes in a network.

2. Description of the Related Art

A central problem in storage is how to store data redundantly, so that even if a particular piece of storage fails, the data will be recoverable from other sources. One scheme is to simply store multiple copies of everything. While that works, it requires considerably more storage for a particular level of reliability (or, contrapositively, it provides considerably less reliability for a particular amount of storage).

To achieve better reliability, erasure codes can be used. An erasure code takes an original piece of data and generates what are called "shares" from it. Shares are designed so that as long as there are enough shares that their combined size is the same as the size of the original data, the original data can be reconstructed from them. In what is referred to as a k-of-n erasure coding scheme, n shares are generated and any k of them can be used to reconstruct the original data. Each share is of size 1/k times the size of the original data so that the shares contain enough information for reconstruction. The n may be highly variable. Storing more shares will result in greater reliability, but the number of shares can scale from k to essentially infinity. The trivial scheme of simply storing multiple copies of the original data can be thought of as a 1-of-n scheme for n copies, and the highly unreliable but also simple scheme of chopping the original data into pieces and storing them all separately can be though of as a k-of-k scheme for k pieces.

The technique of erasure coding first breaks up the original data into k pieces, then treats those pieces as vectors in a Galois field (GF) and generates shares by multiplying the pieces by random coefficients and adding them together. Erasure coding can also be performed by treating the pieces as vectors modulo a prime number. For simplicity, the erasure coding described below uses Galois fields. A share then comprises the result of that computation along with the random coefficients. The randomness of the coefficients causes there to be some chance of the original data being non-recoverable, essentially equal to the reciprocal of the number of elements of the Galois field being used. For storage purposes, a Galois field of size $2^{32}$ or $2^{64}$ (corresponding to treating sections of 4 and 8 bytes respectively as individual units) is a reasonable tradeoff between computational overhead and likelihood of data being non-recoverable by chance, being extremely unlikely with $2^{32}$ and essentially impossible with $2^{64}$.

The above technique faces limitations when used for distributed storage over the Internet. For Internet storage, the scarce resource is bandwidth, and the storage capacity of the end nodes is essentially infinite (or at least cheap enough to not be a limiting factor), resulting in a situation where the limiting factor on any storage is the amount of bandwidth to send it. For initial storage, this results in a very similar model to one where the limiting factor is storage capacity; there is a one-to-one replacement of bandwidth for storage. But after initial storage, significant bandwidth resources can be consumed for replacing failed storage media (and all storage media eventually fails). Typically when redundant storage is being done locally, e.g., in a local area network, a full recovery of the original data for the shares held by failed media is performed and stored transiently, then new shares are created and stored on another piece of media, and the transient complete copy is then thrown away. To do the same thing across the Internet would require retrieving k shares from the various remaining storage media, reconstructing the original data, generating a new k shares, and sending the shares to the storage media (including the replacement storage media). This requires 2 k times the size of the share being used in bandwidth over the Internet, which becomes rapidly unacceptable as k gets large.

Simply storing multiple copies of the data does a better job of avoiding usage of bandwidth, but has much worse reliability properties and has wastage of its own on the scale of n, since as more copies of something need to be held, more bandwidth gets used as those copies go bad.

SUMMARY

A system, method, and computer program product replace a failed node storing data relating to a portion of a data file. In one embodiment, an indication of a new storage node to replace the failed node is received at each of a plurality of available storage nodes. The available storage nodes each contain a plurality of shares generated from a data file. These shares may have been generated based on pieces of the data file using erasure coding techniques. A replacement share is generated at each of the plurality of available storage nodes. The replacement shares are generated by creating a linear combination of the shares at each node using random coefficients. The generated replacement shares are then sent from the plurality of storage nodes to the indicated new storage node. These replacement shares may later be used to reconstruct the data file.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
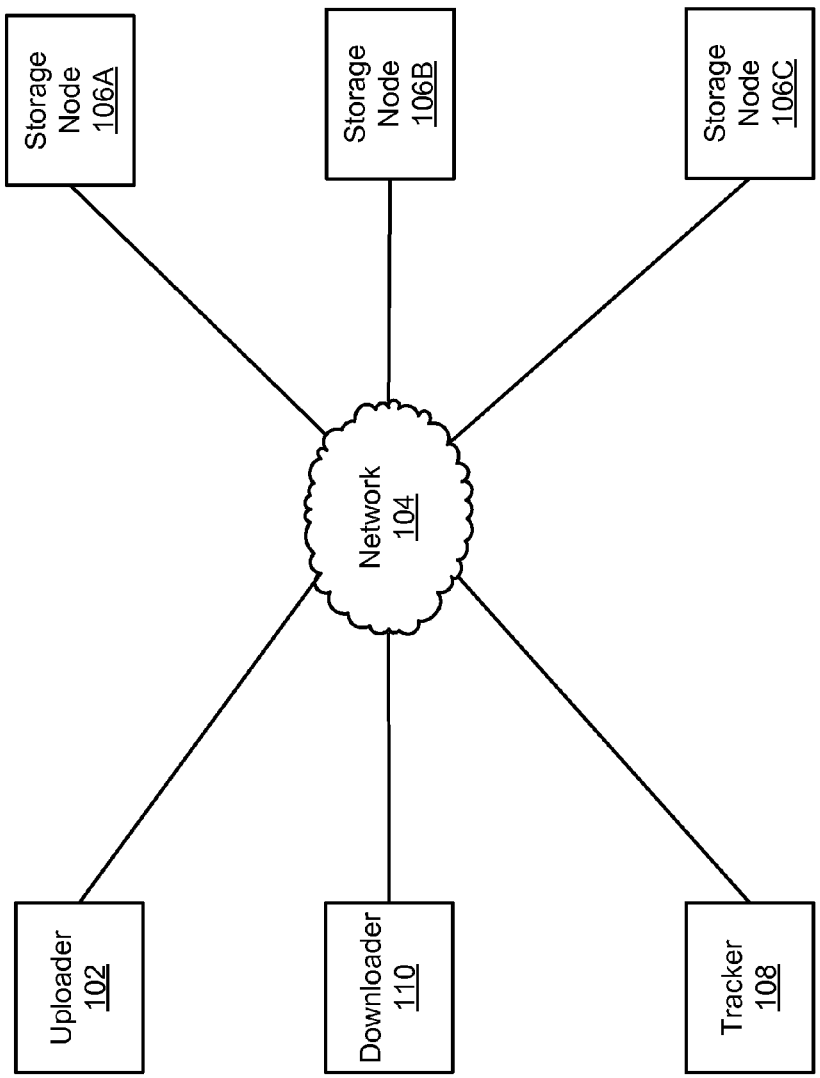
FIG. 1 illustrates an environment including storage nodes for the distributed storage of data, in one embodiment.

FIG. 1 illustrates an environment 100 including storage nodes 106 for the distributed storage of data, in one embodiment. The uploader 102 initially contains a data file to be stored on the storage nodes. An operator of the uploader may desire to store the file on the storage nodes for various reasons, such as backing up the file or sharing the file with others. The uploader divides the files into shares, further described below, and sends the shares to the various storage nodes over the network 104. The storage nodes 106 receive the shares and store the shares. The downloader 110 retrieves the shares from the various storage nodes and reconstructs the data file. In one embodiment, the downloader 110 is the same as the uploader 102. The tracker 108 can track aspects of the storage system, such as the availability or unavailability of the various storage nodes and the locations of various shares. The storage nodes 106 and the uploader 102 and downloader may receive information from the tracker for sending, receiving, or creating shares.

Any of the storage nodes 106 may become unavailable at any time. For example, the data stored on a storage node may be lost or the network connectivity of the node may be lost. The shares sent by the uploader 102 are distributed at the storage nodes 106 such that one or more of the storage nodes 106 can fail yet the data file remains fully recoverable. There is some redundancy between shares on different storage nodes. When a particular storage node 106 becomes unavailable, a replacement storage node can be activated, and the remaining storage nodes 106 generate replacement shares and send these shares directly to the replacement storage node for storage there. These replacement (also referred to as "new") shares can be constructed by recombining existing shares at the remaining nodes. It is not necessary for the shares to be sent to a single location (e.g., the uploader), reconstructed into the original file, and then re-divided into new shares which are sent to the current nodes. As a result, bandwidth consumption over the network 104 is reduced when storing shares on a replacement node after a node has become unavailable.

The uploader 102, downloader 110, tracker 108, and storage nodes 106 may be computers comprising a CPU, memory, hard disk or other storage device, network interface, peripheral interfaces, and other well known components. The storage nodes 106 may include large amounts of available storage space. In one embodiment, the storage nodes may be network-attached storage devices. Although only three storage nodes are shown in FIG. 1, there may be many more. Additionally, there may also be multiple uploaders 102 and downloaders 110 accessing the storage nodes. There may also be multiple trackers 108 (e.g., there may be backup trackers in case of failure of the main tracker).

The uploader 102, downloader 110, tracker 108, and storage nodes 106 communicate through a network 104. The network may comprise the Internet, a local area network, wireless networks, or various other types of networks. In one embodiment, the storage nodes may be geographically distant from the uploader and downloader, and the transfer of large amounts of data between the uploader, the downloader, and the storage nodes over the network may be expensive. As a result, in some embodiments it may be important to minimize such data transfers during operations such as providing shares to a replacement node.

In one embodiment, the tracker 108 operates as a centralized command and control system operated by a service provider to coordinate the transfer of data between uploaders, downloaders, and storage nodes. Because no bulk data transfers are done directly through the tracker, its bandwidth and computational resources may be low, and it can be made reliable using more traditional failover techniques. The tracker is responsible for keeping track of the locations of shares and storage nodes, and for keeping track of which operations have succeeded and failed. Data transfers of shares are done directly (e.g., from uploader to storage node or from storage node to storage node), with the tracker providing coordination.

Figure 2:
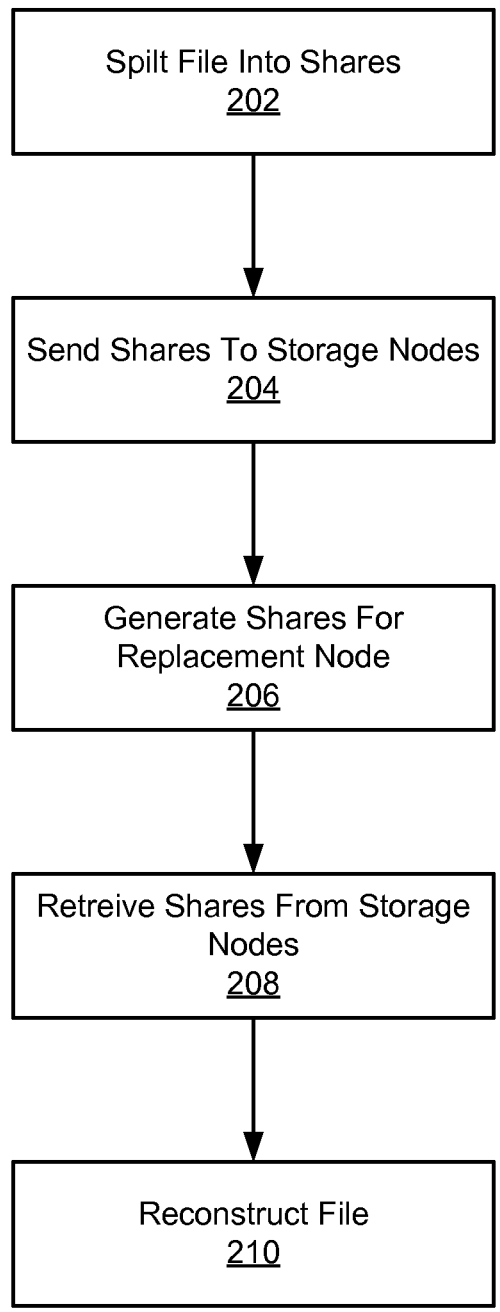
FIG. 2 is a flowchart illustrating a method for the distributed storage of data, in one embodiment.

FIG. 2 is a flowchart illustrating a method for the distributed storage of data, in one embodiment. Initially, a data file to be stored is present at the uploader 102. The uploader splits 202 the files into shares that contain some degree of redundancy. These shares are then sent 204 to various storage nodes 106 and distributed such that the shares on one or more nodes can be lost yet the original data file can still be recovered from the shares on the remaining nodes. At some point one of the storage nodes fails and the shares stored at that node are lost. In order to retain the same level of storage reliability, a new storage node 106 is designated as a replacement node. Replacement shares to be stored on the replacement node are generated 206 at several of the existing nodes, and these shares are sent to the replacement node for storage on the replacement node. Step 206 may occur multiple times as multiple nodes fail and are replaced. At some point, a downloader 110 may be interested in retrieving the data file. The downloader retrieves 208 shares from the current storage nodes and reconstructs 210 the original data file. Embodiments of the steps of FIG. 2 are described in further detail below.

Figure 3:
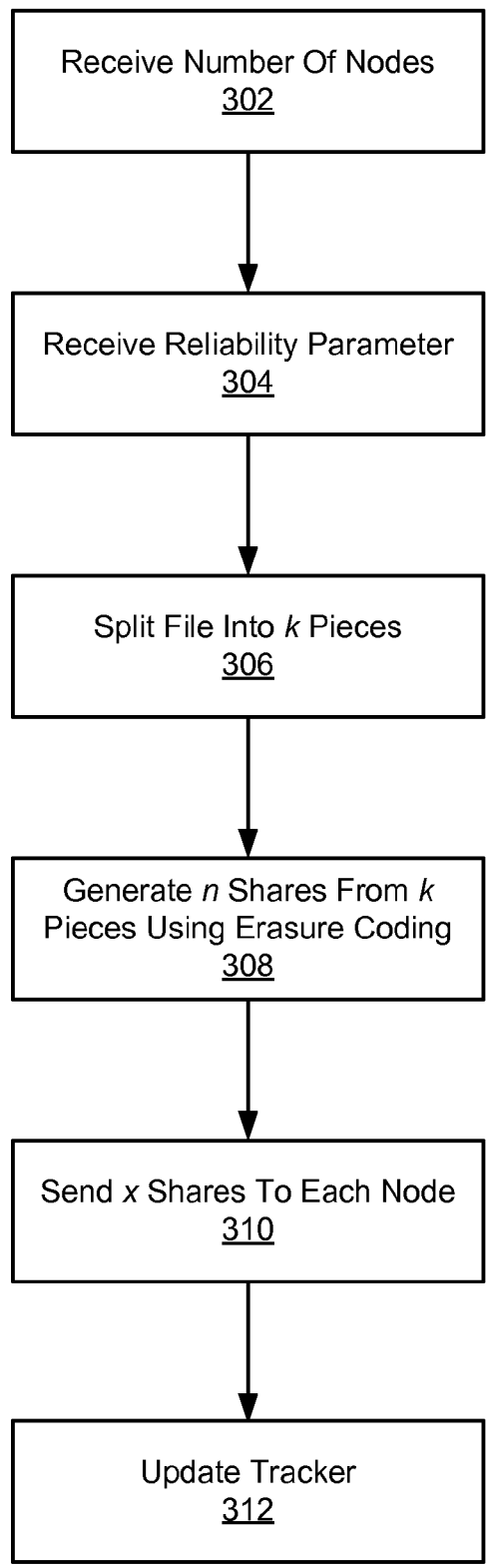
FIG. 3 is a flowchart illustrating a method for splitting a data file into shares and sending shares to storage nodes, in one embodiment.

FIG. 3 is a flowchart illustrating a method for splitting a data file into shares and sending shares to storage nodes, in one embodiment. Initially, an uploader 102 receives 302 the number of available storage nodes 106 from the tracker or a system administrator or other source. In the description below, the initial number of available nodes is represented by N. A reliability parameter, x, is also received 304. The reliability parameter x represents the number of storage nodes containing shares of a data file that need to be available for the data file to be recoverable. x is generally chosen to be less than N so that the file can be still be recovered if one or more nodes becomes unavailable. In the description below, x is assumed to be odd, though embodiments for even values of x may be constructed with minor modifications. The reliability parameter may be received from the tracker or an operator of the uploader or other source. It may be set according to system policy.

Shares are created from the data file using a k-of-n erasure coding scheme described above in the Background, where $k=x*(x+1)/2$ in one embodiment. In one embodiment, k is a quadratic function of x. Each share has a size of 1/k of the data file. A total of n shares are created, where n=xN, and x shares are sent to each storage node. In one embodiment, the data file is split 306 into k sequential pieces which are processed to generate 308 n shares using erasure coding. For example, in step 306, a file of 10 million bytes can be split into sequential pieces of 4,000 bytes each. The processing of step 308 includes multiplying the pieces by random coefficients and adding the (scaled) pieces together in various combinations. For example, each 4,000 byte piece can be multiplied by a 4-byte random coefficient by multiplying each 4-byte segment of the piece by the random coefficient (modulo $2^{32}$) to generate scaled pieces. Then these scaled pieces can be added together, resulting in a share that is a linear combination of the pieces.

In one embodiment, the random coefficients used to generate a particular share are attached to the end of the share. With the shares as vectors in a Galois field of size $2^{32}$, this involves appending a 32 bit (four byte) value to the end of the share for each coefficient. These appended coefficients can be later processed similarly to the rest of the share simplifying the implementation of processing shares. For example, when the share is multiplied by a particular value or added to another share, the random coefficient can similarly be multiplied by the value and added to the corresponding coefficient in the other share. In one embodiment, the file is split into reasonably sized units and is then split again into smaller pieces.

The shares are then sent 310 to the storage nodes 106 and stored on the nodes. Specifically, x shares are sent to each of the N storage nodes using the k-of-n technique described above. The shares are distributed to the nodes so that the failure of any N−x nodes will leave enough information in the remaining shares on the remaining available nodes to reconstruct the data file. The shares provide the N storage nodes with a certain amount of redundancy to withstand a certain amount of node failures, and provide each of the nodes information pertaining to all pieces of the file. One optimization for the initial distribution of shares is for each of the shares of a single storage node to be generated from a different set of (x+1)/2 pieces of the data file. This gives the storage node information pertaining to all pieces of the file while lessening the amount of computation required to generate the shares. In one embodiment, the initial pieces of the data file are divided into buckets, and each share (for initial distribution) is created by combining a piece from each of the buckets.

The tracker 108 can be updated 312 to be aware of the current status of shares and storage nodes. The uploader 102 can provide the tracker with information identifying each generated share and identifying the storage node 106 to which the share was stored. The identifying information of a share may include information regarding which sequential piece of the data file the share corresponds to. The tracker can also be updated with the status of each storage node as being available and of containing particular shares related to the data file. The tracker can also update an overall status of the data file as being in a "stored" state.

The initial storage of data on storage nodes by the uploader 102 cannot be made reliable in the technical sense of having failover, because the uploader itself is a single point of failure. In one embodiment, when the uploader requests that a data file be stored, the tracker 108 may consider the data file to be in the "uploading" state, from which it may go to the "failed" state if the uploader appears to have failed. If enough storage nodes receive the required shares, then state of the data file is updated in the tracker to the "stored" state. The "stored" state may also have two advisory sub-states of "available" and "unavailable" depending on whether the number of storage nodes which currently have shares is at least x. Initially upon successful upload, the sub-state is "available" but may change as nodes fail as described below.

Figure 4:
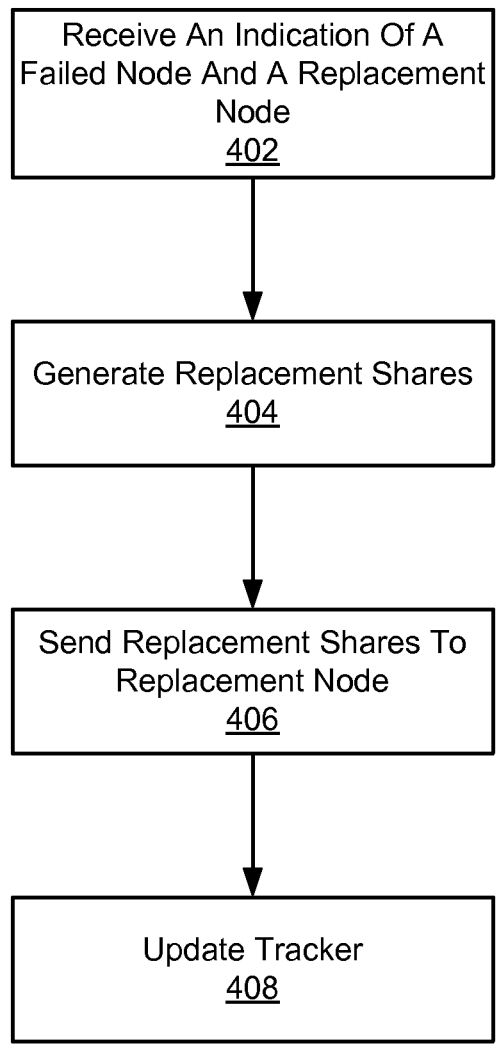
FIG. 4 is a flowchart illustrating a method of generating shares for a replacement storage node, in one embodiment.

FIG. 4 is a flowchart illustrating a method of generating shares for a replacement storage node 106, in one embodiment. As mentioned above, a storage node may fail for various reasons at any time. Such reasons may include, for example, equipment failure, network connectivity failure, and power failure. Storage nodes may also be intentionally taken offline, with or without advance notice. A node that has failed or is taken offline is also referred to as an unavailable node. When a node has failed, it is often useful to quickly set up a replacement node so that the same level of reliability is maintained in the system of storage nodes. If fewer than N−x nodes have failed, then the remaining nodes still contain enough information to recover the data file, and replacement nodes can be brought online to maintain the reliability of the system.

An indication of a failed node and a replacement node is received 402. There may also be multiple failed nodes and replacement nodes, but the case of a single node is described here for clarity. This indication may be received at the tracker 108. In one embodiment, the tracker periodically checks the status of the nodes (or receives status updates from the nodes) in order to identify failed nodes. The tracker may identify a particular replacement node from a pool of free nodes or may receive an indication of a replacement node from some other source such as a system administrator. The indication of a failed or replacement node may comprise a network address or other identifier of the node.

The tracker 108 then notifies any x of the remaining available nodes of the replacement node. In one embodiment, these nodes may receive a notification directly. In one embodiment, the tracker notifies the replacement node of the available nodes and the replacement node initiates transfers from the available nodes. These x available nodes, also referred to as uploading nodes, then each generate 404 a replacement share and send 406 this replacement share to the replacement node. Each uploading node generates a replacement share by multiplying each of its shares (including the coefficients of the shares) by a random scaling value and then by adding those together. For example, if the share is 400 bytes long and the random scaling value is a 4-byte number, the share is divide into 100 4-byte sections and each section is multiplied by the random scaling value (modulo $2^{32}$). The original file data contained within the shares remains recoverable because the coefficients of the shares have been affected by the random scaling values in the same way that the share data has been. As a result, the replacement share generated by each node represents a combination of the data currently held by the shares of that node.

Figure 5:
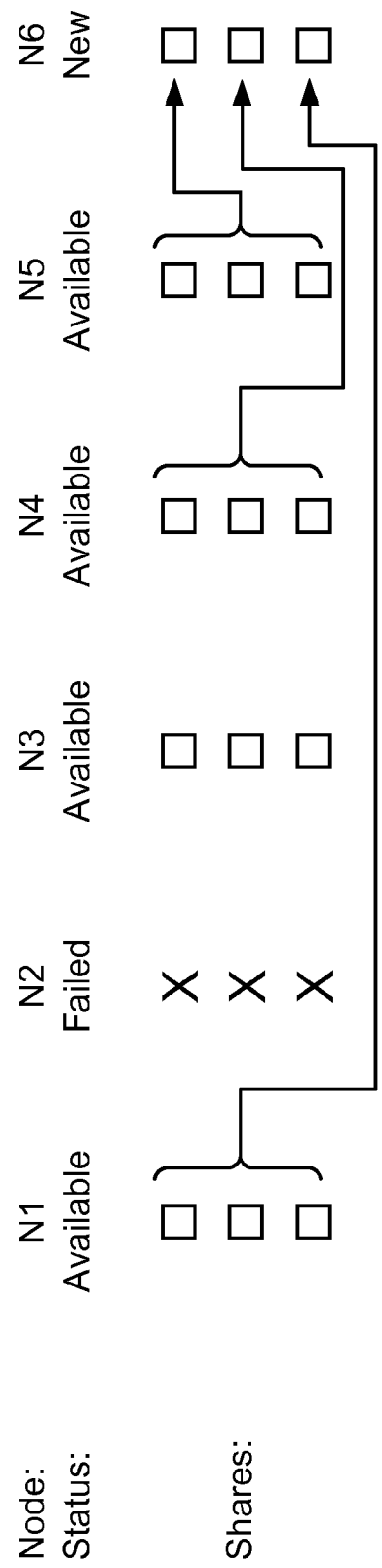
FIG. 5 is a schematic diagram illustrating the generation of replacement shares for a replacement node from remaining available nodes, in one embodiment.

FIG. 5 is a schematic diagram illustrating the generation of replacement shares for a replacement node from remaining available nodes, in one embodiment. In the example shown in FIG. 5, the initial number of nodes, N, is 5, and the reliability parameter x is 3, so that up to two nodes can fail without irrecoverable data loss. Each node contains x shares (three shares in this example). Node N2 has failed, resulting in four remaining available nodes. N6 has been identified as a replacement (or new) node to bring the number of nodes back to five. Available nodes N1, N4, and N5 have been selected by the tracker to generate replacement shares for N6. Each of the three selected nodes combines its three shares to generate a single replacement share for N6. These replacement shares are sent directly from the available nodes to N6 and stored on N6.

The tracker 108 is updated 408 to indicate the new available node(s) and the new shares on the new node(s). Individual storage nodes can have a state of being "available" or "unavailable". The new nodes can be updated to be "available" once they have downloaded all shares and the failed node can be updated to be "unavailable". In one embodiment, there is always assumed to be a possibility of a node coming back at some later time, so a node is not marked as permanently "unavailable". While a storage node is attempting to download share from other nodes or from the uploader, it may be assigned a state of "downloading" by the tracker.

Whether an attempt to generate a combined share by a storage node succeeds or fails is a judgment made by the storage node and is reported to the tracker 108. In one embodiment, during initial upload of a data file, the tracker may start a few transfers of shares to storage nodes 106, then add more as those either succeed or fail, and halt if enough nodes have complete sets of shares or give up if too many in a row fail. Likewise, if a data file has been stored and enough storage nodes fail that the amount of shares available is below a safety threshold, the tracker can start a transfer to a new storage node, and then go back to steady state if that transfer succeeds or do a failover to another node if it fails, and temporarily mark the particular piece of data as unavailable if too many transfers in a row fail. In the example of FIG. 5, suppose that a safety threshold of five nodes is set. If a node fails and the number of nodes falls below five, the tracker can contact the remaining nodes to begin generating replacement shares for a new node. If the transfer of replacement shares to the new node fails, the tracker can mark this node as failed, identify a second new node, and contact the remaining nodes to begin generating replacement shares for the second new node. If the transfer of replacement shares to the second new node fails also, the data file of the shares can be marked as temporarily unavailable for download.

Transfers may be done by the uploading storage node generating a new recombined share, and the downloading storage node merely storing it. To make the transferring system more versatile, a file may be split into pieces initially (at the uploader) before being split into shares, so that the x nodes which supply shares for one piece do not have to be the same as the x nodes which supply the shares for another piece. Transfers can be finished from a different set of nodes than the nodes they were started from in case one of the nodes goes down midway. Also, transfers can be done from every available source of shares simultaneously, which is a benefit because the bottleneck on data transfer rates is generally on the uplink side, so downloading from multiple sources will result in faster transfers as well as a more evenly distributed use of bandwidth. This in turn results in a quicker recovery from failure and hence greater reliability. In one embodiment, when a storage node begins a transfer, it is given the complete set of available sources believed to be online by the tracker, possibly including the original uploader, and it then transfers at whatever rate it can from all available sources.

The above described process of replacing failed nodes 106 may be repeated any number of times as necessary. By following this process, storage nodes can fail and be replaced over time, and shares for replacement nodes can come from nodes that were replacement nodes themselves in previous generations. Any x nodes with complete sets of shares can be used to recover the original file, regardless of how many generations of node failures have occurred. In many practical cases, the number of nodes needed for recovery is less than x nodes. For example, when generating replacement shares for the first replacement node after initial storage, shares from any $(x+1)/2$ nodes is sufficient.

After enough generations of nodes failing and being replaced, the number of nodes necessary for a complete recovery will monotonically approach x, especially if there is ever an occasion when the number of available nodes goes down to x. Although in practice reliability is likely to be better, x nodes at most being necessary is a rigorous minimum performance of the system. In one embodiment, the storage system can start with fewer nodes for initial storage of the data file and can increase the number of nodes over time as the reliability of the system is expected to go down. For example, after a certain time or certain number of node failures and replacements, an additional node can be added to the system. The shares for this additional node can be generated in the same way that shares for replacement nodes are generated. However, it is possible that reliability of the system may go up over time, since the nodes still holding shares for the data file will have had more uptime and hence be less likely to fail than the still unproven ones which are used for initial storage. This consideration may tend to balance out the expected decrease in reliability mentioned above.

If multiple replacement shares are provided from a single node to replacement nodes over subsequent generations of node failure, data loss may result. However, it is possible to use extra information to verify the integrity of replacement shares received from an available node to detect this data loss. In the event that a replacement share fails this verification, a new replacement share can be requested from the node or from another node.

The integrity of a replacement share from a particular available node can be verified either by receiving extra information from that particular available node or by receiving information from another available node. This verification does not significantly increase bandwidth usage over the network. To verify a newly received share, a replacement (or new) node sends a seed to a pseudo-random number generator (PRNG) to an available node. The available node generates a new recombined share and then multiplies all the entries in it (aside from the coefficients) by the corresponding current value in the PRNG's output, and adds all those together. The available node sends this sum, along with the coefficients, to the replacement node as verification information, also referred to as hash check information. The replacement node can then calculate what the value of the sum should be given the complete shares it has and the coefficients. The replacement node verifies the integrity of the newly received share if the calculated value is equal to the received sum. It is possible that the available data does not contain any redundancy, and as a result the integrity verification may be of limited value. However, this possibility is very remote, especially soon after initial storage.

The effectiveness of the approach described above of generating replacement shares by recombining shares on available nodes can be demonstrated empirically. One way of determining how much data is recoverable from a set of shares after a series of recombinations is to run a simulation representing each share by a random vector. Then, a series of operations can be performed on those vectors, and the rank of the matrix formed by the corresponding vectors can be calculated. This rank indicates the amount of recoverable data from the vectors (or shares).

An analysis of the efficiency of the approach described above is now presented. Since x peers are necessary for a recovery, the best possible performance based on information theoretic limits would be for those peers to have k, or $x*(x+1)/2$, shares. With this scheme, those x peers each have x shares, for a total of $x*x$ shares. The ratio between the two is thus $(x*(x+1)/2)/(x*x)=(x+1)/(2*x)$ which asymptotically approaches ½ as x gets larger, so x can be made arbitrarily large with very little extra bandwidth overhead. Since larger x corresponds to more reliability, it is desirable for x to be chosen to be a large value (e.g., slightly less than the total number of nodes N). The limiting factor on x in practice is likely to be computational overhead, although there are some other second order effects which might become prominent. Examples are effects on the wire protocol overhead, central data indexing overhead, size coefficients becoming significant, or x approaching the total number of nodes N in the system as a whole, which is a hard limit.

By generating replacement shares from existing nodes as described above, high levels of reliability can be maintained while keeping bandwidth usage low. It is possible to merely wait until there are only k storage nodes left and then perform a recovery (and new generation of shares to re-store the data in the storage nodes). This approach has poor reliability characteristics since an additional storage node failure may result in data loss. This approach also requires regeneration of the original file and new shares (e.g., at the uploader). Another approach is to do a full recovery and regeneration of shares (e.g., at the uploader) each time a storage node is lost. This has better reliability characteristics, but may require large amounts of bandwidth.

Returning to FIG. 2, shares are retrieved 208 from the storage nodes by a downloader 110. A downloader interested in a data file can retrieve information from the tracker 108 regarding which storage nodes currently have shares of the file. The downloader can then directly retrieve the shares from the specified storage nodes 106. The downloader may retrieve shares from x or more available nodes. The downloader then reconstructs 210 the original data file from the retrieved shares. The reconstruction is performed using the coefficients included with each share along with share sequence information from the tracker.

Downloads generally cannot be made reliable in the sense of failover because the downloader itself is a single point of failure. Download information can be viewed as advisory, and the tracker may merely provide information about all available nodes having complete shares to a prospective downloader, including possibly the original uploader, and the downloaders determine for themselves whether they succeed or fail (although failure for any reason other than the downloader going offline should be rare).

Unlike when a new node is being made available, it is acceptable for a node doing a complete recovery to download multiple shares from a single node. Suppose a downloading node (e.g., the downloader 110) has already received a share from an uploading storage node 106. To determine if an additional recombined share from the uploading node might be helpful, the uploading node can send the downloading node the coefficients of the additional share. The downloading node can calculate if that share is linearly independent of the ones it already has using the coefficients, and if so, the downloading node can request the share from the uploading node. In one embodiment, the downloading node need not request the same share, but can request another share instead, because in general one additional share will be helpful if and only if all but a miniscule fraction of other shares are helpful. The downloading node can also request hash check information using the same technique as used by new nodes to verify data integrity as described above. In general, hash check information from a node is useful if and only if extra shares from that node could be useful.

In one embodiment, the distributed storage techniques described above on unreliable, widely distributed storage devices (possibly attached to computers). There are currently many storage devices with very large amounts of unused capacity on unmetered Internet connections that can be used for distributed storage. These storage devices (i.e., storage nodes 106) may be owned and operated by various businesses and individuals. The storage devices may have high failure rates, but the failures are largely uncorrelated. Since it is unlikely that many nodes will fail at once, the approach described above is likely to work well. In one embodiment, the tracker 108 may enable storage device providers to make their storage available for users needing to store data. The tracker may include a web server for storage device providers to register their storage devices with the tracker so that the devices can begin being used as initial storage nodes or replacement nodes for data files of storage users. The tracker may also track usage of the storage devices and facilitate payment from storage users to storage device providers.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A method for replacing anode storing distributed data, the method comprising:
   receiving, by a first storage node, a first set of shares generated from a data file wherein each share in the first set includes a linear combination of pieces of the data file along with a set of coefficients used to generate the linear combination;
   receiving, by the first storage node, an indication of a new storage node replacing a failed node, the failed node including a second set of shares generated from the data file;
   generating, by the first storage node, a first replacement share responsive to the indication, wherein the first replacement share is generated by:
      multiplying each share in the first set and the set of coefficients by a random scaling value; and
      combining the multiplied first set of shares and the multiplied set of coefficients; and
   transmitting, by the first storage node, the generated first replacement share to the new storage node;
   wherein the first replacement share and at least one other replacement share form the second set of shares at the new storage node, the other replacement share generated by a second storage node.

2. The method of claim 1, wherein an overall number of replacement shares generated to form the second set of shares at the new storage node equals a reliability parameter, wherein the reliability parameter is based on a total number of storage nodes required for the data file to remain recoverable.

3. The method of claim 1, further comprising:
   verifying the integrity of the generated first replacement share.

4. The method of claim 1, wherein the shares of the first set are generated using erasure coding based on pieces of the data file.

5. The method of claim 1, wherein the first replacement share and at least one other replacement share are used to reconstruct the data file.

6. The method of claim 1, wherein the first replacement share and at least one other replacement share are used to generate subsequent replacement shares for a subsequent new node.

7. The method of claim 1, wherein the indication is received from a tracker that monitors the status of storage nodes and tracks locations of shares.

8. The method of claim 1, further comprising:
   sending hash check information to the new storage node for verifying the first replacement share.

9. The method of claim 1, wherein the integrity of the first replacement node is verified by the new storage node using hash check information provided by an additional storage node.

10. A computer system for replacing a failed node storing distributed data, the system comprising:
    a computer processor; and
    a non-transitory computer-readable storage medium storing executable computer program instructions executed by the computer processor, the computer program instructions configured to:
       receive a first set of shares generated from a data file wherein each share in the first set includes a linear combination of pieces of the data file along with a set of coefficients used to generate the linear combination;
       receive an indication of a new storage node replacing a failed node, the failed node including a second set of shares generated from the data file;
       generate a first replacement share responsive to the indication, wherein the first replacement share is generated by:
          multiplying each share in the first set and the set of coefficients by a random scaling value; and
          combining the multiplied first set of shares and the multiplied set of coefficients; and
       transmit the generated first replacement share to the new storage node;
       wherein the first replacement share and at least one other replacement share form the second set of shares at the new storage node, the other replacement share generated by a second storage node.

11. The system of claim 10, wherein an overall number of replacement shares generated to form the second set of shares at the new storage node equals a reliability parameter, wherein the reliability parameter is based on a total number of storage nodes required for the data file to remain recoverable.

12. The system of claim 10, further comprising:
    sending hash check information to the new storage node for verifying the first replacement share.

13. The system of claim 10, wherein the first set of shares are generated using erasure coding based on pieces of the data file.

14. The system of claim 10, wherein the first replacement share and at least one other replacement share are used to reconstruct the data file.

15. The system of claim 10, wherein the first replacement share and at least one other replacement share are used to generate subsequent replacement shares for a subsequent new node.

16. The system of claim 10, wherein the indication is received from a tracker that monitors the status of storage nodes and tracks locations of shares.

17. A computer program product having a non-transitory computer-readable storage medium having executable computer program instructions recorded thereon for replacing a failed node storing distributed data, the computer program instructions further configured for:
    receiving, by a first storage node, a first set of shares generated from a data file wherein each share in the first set includes a linear combination of pieces of the data file along with a set of coefficients used to generate the linear combination;
    receiving, by the first storage node, an indication of a new storage node replacing a failed node, the failed node including a second set of shares generated from the data file;

generating, by the first storage node, a first replacement share responsive to the indication, wherein the first replacement share is generated by:
  multiplying each share in the first set and the set of coefficients by a random scaling value; and
  combining the multiplied first set of shares and the multiplied set of coefficients; and
transmitting, by the first storage node, the first replacement share to the new storage node;
wherein the first replacement share and at least one other replacement share form the second set of shares at the new storage node, the other replacement share generated by a second storage node.

18. The computer program product of claim 17, wherein the computer program instructions are further configured for:
  sending hash check information to the new storage node for verifying the first replacement share.

19. The computer program product of claim 17, wherein the first replacement share and at least one other replacement share are used to reconstruct the data file.

20. The computer program product of claim 17, wherein an overall number of replacement shares generated to form the second set of shares at the new storage node equals a reliability parameter, wherein the reliability parameter is based on a total number of storage nodes required for the data file to remain recoverable.

21. The computer program product of claim 17, wherein the shares of the first set are generated using erasure coding based on pieces of the data file.

22. The computer program product of claim 17, wherein the first replacement share and at least one other replacement share are used to generate subsequent replacement shares for a subsequent new node.

23. The computer program product of claim 17, wherein the indication is received from a tracker that monitors the status of storage nodes and tracks locations of shares.

* * * * *

UNITED STATES PATENT AND TRADEMARK OFFICE
CERTIFICATE OF CORRECTION

PATENT NO. : 8,522,073 B2
APPLICATION NO. : 12/699670
DATED : August 27, 2013
INVENTOR(S) : Bram Cohen Page 1 of 1

It is certified that error appears in the above-identified patent and that said Letters Patent is hereby corrected as shown below:

In the Claims:

Column 11, line 20, delete "anode" and insert -- a node --.

Signed and Sealed this
Third Day of June, 2014

Michelle K. Lee
*Deputy Director of the United States Patent and Trademark Office*